United States Patent
Bayram et al.

(10) Patent No.: US 11,889,264 B2
(45) Date of Patent: Jan. 30, 2024

(54) FIBER OPTIC MEMS MICROPHONE

(71) Applicant: ORTA DOGU TEKNIK UNIVERSITESI, Ankara (TR)

(72) Inventors: Baris Bayram, Ankara (TR); Asaf Behzat Sahin, Ankara (TR); Ilker Oguz, Ankara (TR); Goktug Cihan Ozmen, Ankara (TR); Ekin Muharrem Karaca, Ankara (TR); Doğa Buse Cavdir, Ankara (TR)

(73) Assignee: ORTA DOGU TEKNIK UNIVERSITESI, Ankara (TR)

( * ) Notice: Subject to any disclaimer, the term of this patent is extended or adjusted under 35 U.S.C. 154(b) by 199 days.

(21) Appl. No.: 17/604,441

(22) PCT Filed: Apr. 18, 2019

(86) PCT No.: PCT/TR2019/050262
§ 371 (c)(1),
(2) Date: Oct. 18, 2021

(87) PCT Pub. No.: WO2020/214108
PCT Pub. Date: Oct. 22, 2020

(65) Prior Publication Data
US 2022/0182770 A1     Jun. 9, 2022

(51) Int. Cl.
*H04R 23/00* (2006.01)
(52) U.S. Cl.
CPC ..... *H04R 23/008* (2013.01); *H04R 2201/003* (2013.01)

(58) Field of Classification Search
CPC ................. H04R 23/008; H04R 2201/003
See application file for complete search history.

(56) References Cited

U.S. PATENT DOCUMENTS

| | | | |
|---|---|---|---|
| 10,356,533 B2* | 7/2019 | Dahl | G10L 25/84 |
| 2016/0123829 A1* | 5/2016 | Reck | G01L 9/0076 73/705 |
| 2018/0086628 A1* | 3/2018 | Vossough | G01L 19/0007 |
| 2018/0208454 A1* | 7/2018 | Hoekstra | H04R 23/008 |

FOREIGN PATENT DOCUMENTS

| | | |
|---|---|---|
| CN | 101778328 A | 7/2010 |
| CN | 104113813 A | 10/2014 |

(Continued)

OTHER PUBLICATIONS

Chonghua Zhou, et al., Fiber-optic microphone based on a combination of Fabry-Perot interferometry and intensity modulation, The J. Acoust. Soc. Am., 1995, 1042-1046, vol. 98 No. 2.

(Continued)

*Primary Examiner* — Suhan Ni
(74) *Attorney, Agent, or Firm* — Bayramoglu Law Offices LLC

(57) ABSTRACT

A fiber optic MEMS microphone featuring an electrically deflectable MEMS membrane via a conversion of an optical energy propagating in an optical fiber cable to an electrical energy with a photodiode chip. The fiber optic MEMS microphone includes a MEMS device, the photodiode chip, a voltage, a power adjustable laser beam and a light.

13 Claims, 13 Drawing Sheets

(56) References Cited

FOREIGN PATENT DOCUMENTS

CN 109506764 A 3/2019
WO 2014195372 A1 12/2014

OTHER PUBLICATIONS

Ming Li, et al., Optical MEMS pressure sensor based on Fabry-Perot interferometry, Optics Express, 2006, pp. 1497-1504, vol. 14, No. 4.
Ji-Huan Chen, et al., Fabry-Perot interference-based fiber-optic sensor for small displacement measurement, Optics Communications, 2010, pp. 3315-3319, 283.
J. A. Bucaro, et al., Fiber-optic hydrophone, The Journal of the Acoustical Society of America, 1977, pp. 1302-1304, vol. 62 No. 5.
Qingxu Yu, et al., Pressure Sensor Based on the Fiber-Optic Extrinsic Fabry-Perot Interferometer, Photonic Sensors, 2011, pp. 72-83, vol. 1, No. 1.
G.C. Fang, et al., MEMS Fiber-optic Fabry-Perot pressure sensor for high temperature application, Proc. of SPIE, 2016, vol. 10155.
Zhenfeng Gong, et al., High Sensitivity Fabry-Perot Interferometric Acoustic Sensor for Low-Frequency Acoutic Pressure Detections, J. Lightwave Tech., 2017, pp. 5276-5279, vol. 35, No. 24.
Yu Wu, et al., A Highly Sensitive Fiber-Optic Microphone Based on Graphene Oxide Membrane, J. Lightwave Tech., 2017, pp. 4344-4349, vol. 35, No. 19.
Bin Liu, et al., An Optical Fiber Fabry-Perot Microphone Based on Corrugated Silver Diaphragm, IEEE Transactions on Instrumentation and Measurement, 2018, pp. 1994-2000, vol. 67, No. 8.
Xueqi Lu, et al., A miniature fiber-optic microphone based on Annular Corrugated MEMS Diaphragm, J. Lightwave Tech., 2018, pp. 5224-5228, vol. 36 No. 22.
Steve T. Cho, et al., Internal Stress Compensation and Scaling in Ultrasensitive Silicon Pressure Sensors, IEEE Transaction on Electron Devices, 1992, pp. 836-842, vol. 39, No. 4.
Mario Di Giovanni, Flat and Corrugated Diaphragm Design Handbook, Mechanical Engineering/11, 1982. CRC Press Taylor & Francis Group.
Goksen G. Yaralioglu, et al., Calculation and Measurement of Electromechanical Coupling Coefficient of Capacitive Micromachined Ultrasonic Transducers, IEEE Transactions on Ultrasonics, Ferroelectrics, and Frequency Control, 2003, pp. 449-456, vol. 50, No. 4.
Ira O. Wygant, et al., Analytically Calculating Membrane Displacement and the Equivalent Circuit Model of a Circular CMUT Cell, IEEE Ultrasonics Symposium Proceedings, 2008, pp. 2111-2114.
Karthik Kadirvel, et al., Design and Characterization of MEMS Optical Microphone for Aeroacoustic Measurement, 42nd Aerospace Sciences Meeting & Exhibit, 2004.

* cited by examiner

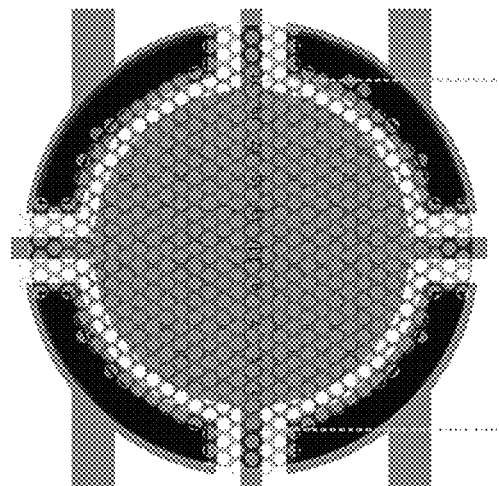
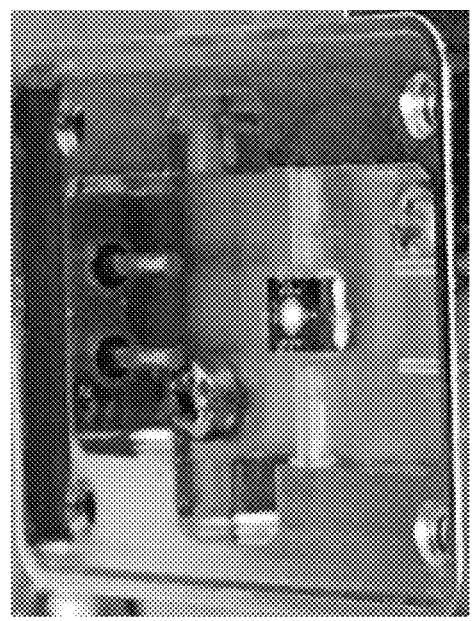
FIG. 4A

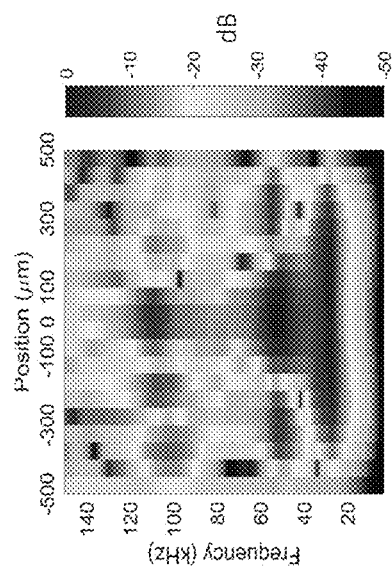
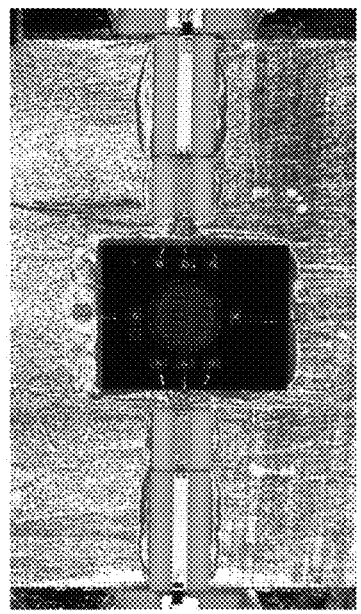
FIG. 4B

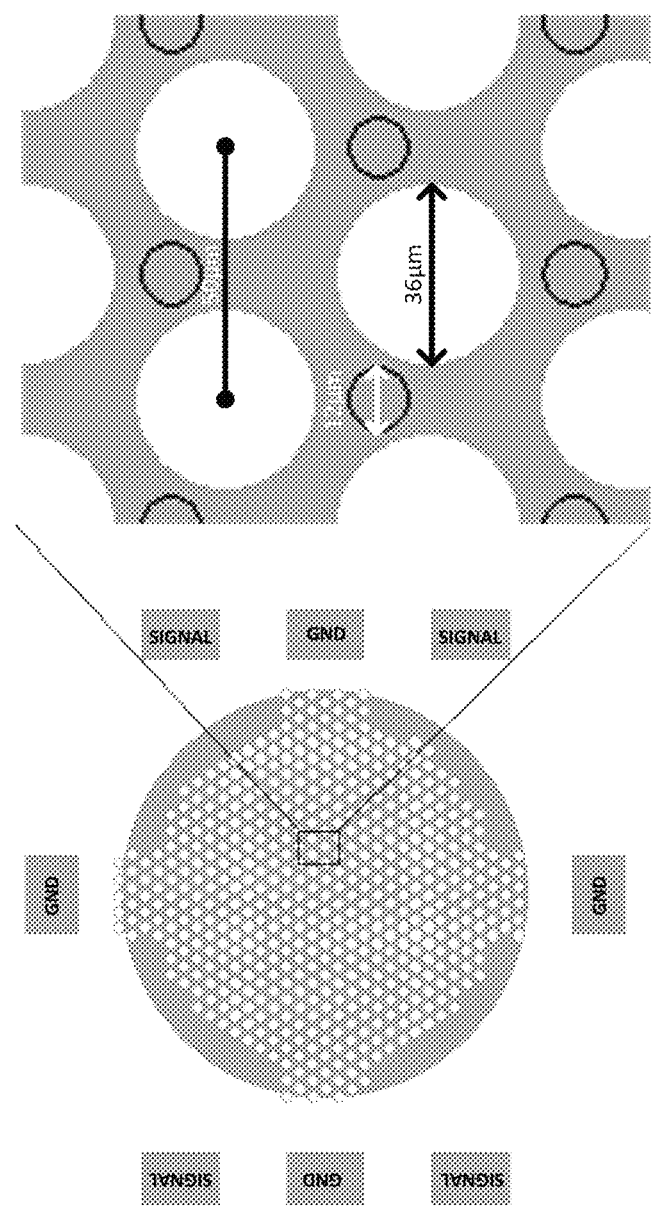

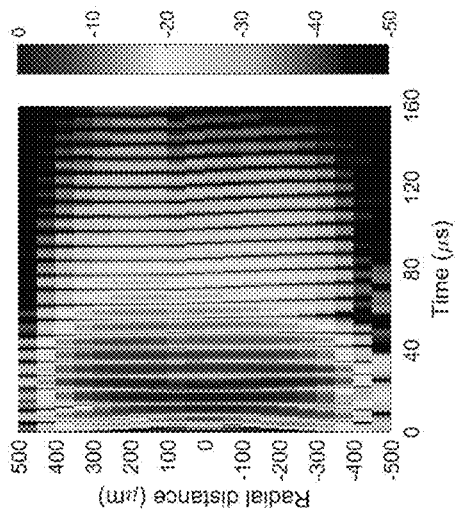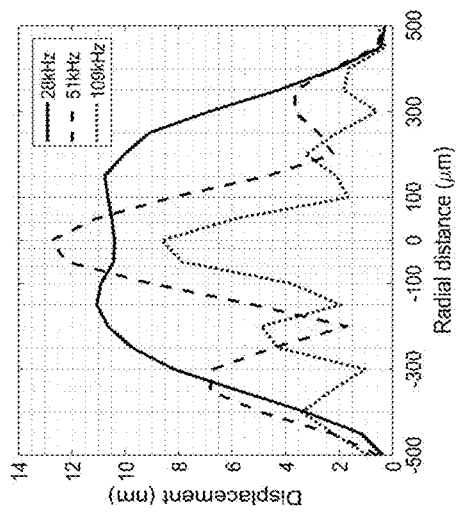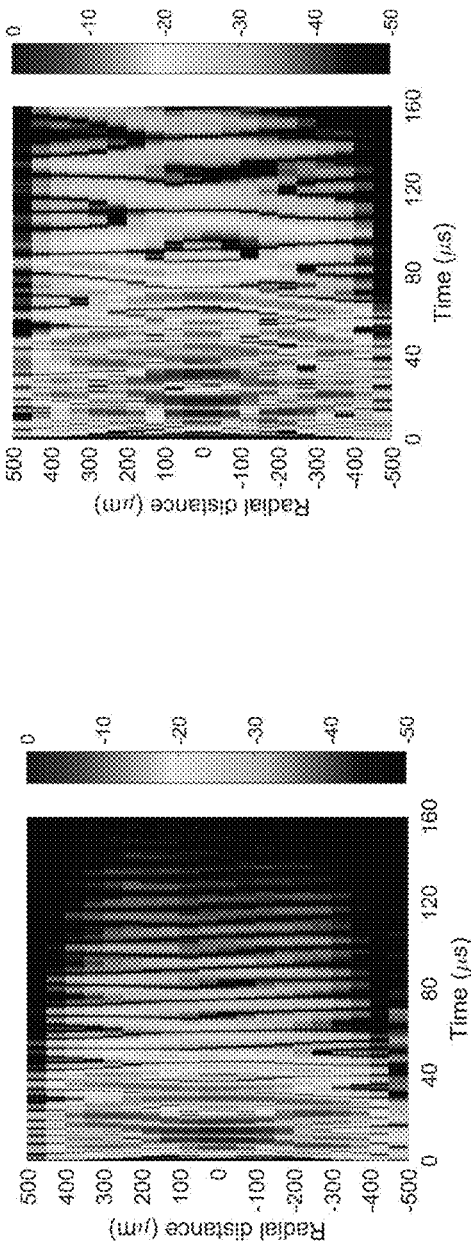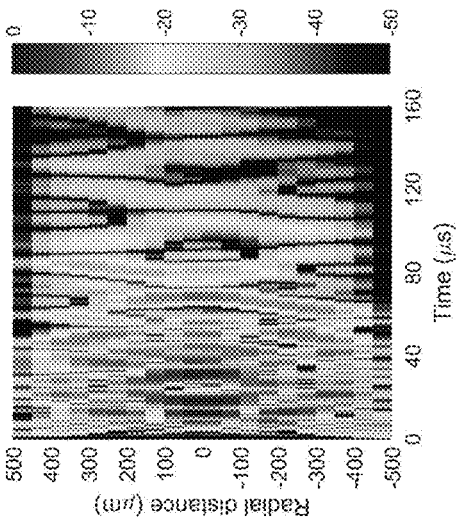
FIG. 12A
FIG. 12B
FIG. 12C
FIG. 12D

FIBER OPTIC MEMS MICROPHONE

CROSS REFERENCE TO THE RELATED APPLICATIONS

This application is the national stage entry of International Application No. PCT/TR2019/050262, filed on Apr. 18, 2019, the entire contents of which are incorporated herein by reference.

TECHNICAL FIELD

The invention relates to fiber optic MEMS microphone that features electrically deflectable MEMS membrane via conversion of optical energy propagating in the optical fiber to electrical energy with photodiode chip.

BACKGROUND

Microphones, which are instruments that convert sound waves into electrical signals, are being developed with MEMS technology. The MEMS microphones have become ideal for use in portable technologies with their resistance to acceleration, low energy consumption, long-term stable performance, high sensitivity and small size. MEMS fiber optic microphones are used in distributed sensor networks and hazardous industrial environments because they are resistant to electromagnetic effects. With very low loss fiber optic cables, they can be carried away for miles away. When MEMS-based fiber optic microphone studies and patents in academic and industrial literature are examined, it is seen that MEMS devices are operated passively-without active voltage applied- and their sensitivities are limited and constant in operation. In commercially available microelectromechanical systems (MEMS) microphones, detection of the audible frequency range (20 Hz-20 kHz) is utilized through some electrical measurements such as current/voltage or capacitive measurements. These measurements are vulnerable to the electrical noise of the system and the environment. In addition, these microphones do not give accurate results under harsh environmental conditions such as high temperature and high pressure. Fiber optical sensors are used in a wide range of sensing applications for temperature, vibration, pressure, index of refraction sensing. Employing the microelectromechanical systems (MEMS) technology based on fiber optic sensing with extrinsic Fabry-Perot interferometry provides high sensitivity detection of high frequency ultrasound. Today, in some applications, fiber optic microphones are preferred over condenser microphones. The conventional condenser microphone is a high impedance device due to the necessity of a high input impedance preamplifier for further signal processing[1]. For the condenser microphone, this additional high impedance preamplifier is an additional burden in the design which reduces the performance of the microphone even for some sophisticated electronic designs. Additionally, due to the cable capacitances, the distance between the microphone and the receiver electronics must be very small which restricts the application of the microphone in a confined space. The fiber optic MEMS microphone has very high immunity to electromagnetic interference since all of the electronic components that is used in the design are kept out of the sensor probe[1]. The main advantage of MEMS technology is that it offers the flexibility to achieve the desired response range, bandwidth, and sensitivity by basically adjusting the size of the membrane[1,2]. Also two different methods are used with fiber optic microphones; phase and intensity modulation. Phase modulation technique gives better performance considering the measurement range and durability[2,3]. For these reasons, the necessity of finding a new way of designing a MEMS microphone for audible frequency range detection has raised. It was shown that utilization of light as the way to detect sound waves gives much better performance than the microphones which senses the sound waves electrically[4].

Optical sensing technique for small displacement measurement is vital for industrial non-destructive techniques, vibration and, design and testing of microstructures for their unique advantages, such as immunity to electromagnetic interferences, stability, repeatability, durability against harsh environments, high sensitivity, high resolution, and fast response[3]. The fiber optic microphone can enable innovative applications in a variety of applications due to the wide dynamic range, high sensitivity and flat frequency response over large bandwidth[1].

In the past two decades, extrinsic Fabry-Perot interferometer based pressure sensors have undergone a significant growth and substantial research has been carried out on it. Diaphragm-based extrinsic Fabry-Perot interferometer sensors have been successfully used for low pressure and acoustic wave detections.

To obtain high fidelity Fabry-Perot interferometer based pressure sensor, the most crucial part is the MEMS membrane. The light propagating through the fiber hits the membrane at the fiber end and then reflects back. At that point, the Fabry-Perot cavity is obtained between the fiber end and the membrane. Small displacements at the membrane are detected by analyzing the interference fringes from the cavity. The feasibility of phase modulation technique is experimentally proven by measurements[4].

By adjusting size of the membrane, the electrical impedance of the membrane in air can be adjusted[1]. Since both incident and reflected beams in fiber optic MEMS microphone share the same optical fiber, environmental effects at the fiber, such as changes in temperature, pressure and vibration do not significantly affect the interference signal obtained by Fabry-Perot interferometer[1]. Fiber optic microphone has the potential capability of on-line and remote sensing. This type of sensor can also be extended to measure vibration and acceleration. Due to the simplicity of the structure and the ease of operation, this design can be used in variety of applications[4]. Pressure sensors can also be utilized via fiber optic idea. It is shown that linear pressure sensitivity between 0 kPa (94 dB) and 600 kPa (210 dB) is achieved in the temperature range of 20° C.-300° C. with these pressure sensors[6].

Recently, different membrane materials, such as Parylene-C and graphene oxide, are proposed for a microphone application. Parylene-C gives strong response in the order of 2000 nm/Pa at 20 Hz. Due to the bio-compatibility of Parylene-C, these acoustic sensors are said to be very useful in biomedical applications[7]. With the developments in the fabrication of graphene oxide, reliable production of it with any desired thickness becomes possible. Graphene oxide based membrane is shown to be give flat response in 100 Hz-20 kHz range[8]. It is also shown that corrugated silver membranes can be used for optical fiber microphones. Introduced corrugations on the membrane was shown to improve the performance of the microphone and the new design gives response in the order of 50 nm/Pa in the range of 63 Hz-1 kHz[9]. In addition to the efforts of finding new membrane materials, there is ongoing research on the improvement of the shape and size of MEMS membranes. One suggested method is to microfabricate an annular corrugated MEMS membrane. In this method, the proposed design can sense the minimum detectable pressure level of 3 µPa/Hz$^{1/2}$ at 1 kHz[10].

SUMMARY

A new approach for MEMS technology, the fiber optic MEMS microphone, is presented in this document. Our invention is a laser-powered active MEMS fiber-optic acoustic sensor microphone. Microphones have an important place in our lives. Traditional microphones are now replaced with MEMS microphones. Small size MEMS microphones are available in capacitive and piezoelectric models.

MEMS microphones are influenced by RF and microwave signals and high magnetic fields such as MRI because they are based on capacitive or piezoelectric electrical measurement techniques. Fiber-optic MEMS microphones are obtained by combining MEMS passive diaphragm and fiber optics. In this invention, an electrically adjustable MEMS membrane instead of a MEMS passive diaphragm is presented. Also, electrical power is generated from the incident laser light right on the spot of the MEMS membrane through a photodiode chip. In doing so, impractical electrical conduction along the fiber-optic cable is elimited and the cost for large capacity use has been significantly reduced. At this point, the idea of transforming the energy of the light carried within the optical cable to the electrical voltage on the membrane by means of a photodetector is used. Sensing element is the most critical part of fiber optic MEMS microphone. This sensing element, membrane, is designed such that the microphone operates in the desired range with desired sensitivity. In this invention, design and characterization of a custom-designed MEMS membrane to be used in an optical fiber optic microphone is performed which will be responsive over the audible frequency range. This design features electrically deflectable membrane having symmetrically distributed air holes across it. Microfabrication is done using a commercially available multi-user multi-project service (POLYMUMPS, MEMSCAP Inc., France). Full electrical and optical characterizations of the membrane are done using an impedance analyzer and laser vibrometer, respectively. The design includes reflective gold-coated surface which makes it suitable for optical interferometry based microphones. The transient and steady state analysis of the membrane is utilized, and the overall response of the membrane as well as the spatial response of it is obtained. The fundamental resonance of the membrane is 28 kHz which is slightly above the frequency range of interest, 20 kHz. The peak displacement of 10 nm is obtained from vibrometer measurements under 100 mV peak-to-peak voltage and 1V DC bias conditions. After converting the applied AC voltage to the pressure, the sensitivity of the membrane is calculated to be around 40 nm/Pa at 28 kHz.

The symmetry of the design is also verified through spatial analysis. This invention offers a new aspect for the design of MEMS membrane for optical microphones. This invention employs MEMS technology to realize a novel membrane rather than finding new membrane materials for fiber optic microphone applications. This MEMS membrane is designed to respond to the audible frequency range. This new design is compatible with optical sensing for detection of membrane displacement. Utilization of a mature microfabrication processes makes the design reliable and reproducible. Extensive analyses of steady state and transient responses of the membrane to different excitations are performed and the performance of the design is verified.

One aspect of the invention, wherein MEMS device is respectively comprising of METAL, POLY2, POLY1, POLY0, SiN, and Si substrate from top to the bottom.

Another aspect of the invention, wherein the diameter of air holes and dimples are set to 36 µm and 12 µm.

Another aspect of the invention, wherein a photodiode chip is Ge-TIA or InGaAs P-I-N photodiode.

Another aspect of the invention, wherein value for the laser operation wavelength is 1064 nm.

Another aspect of the invention, wherein the displacement of the large perforated membrane corresponding to the sound waves in the active MEMS-based fiber optic acoustic microphone is determined by phase modulation of the light.

Another aspect of the invention, wherein the laser beam from the fiber optic cable is used both as a remote power transfer and as an acoustic signal sensor via the MEMS device.

Another aspect of the invention, wherein the control range of the MEMS membrane against acoustic stimulation and the sensitivity of the measuring system are adjusted by controlling the bias of the MEMS device in the microphone.

Another aspect of the invention, wherein to obtain sufficiently large oxide etch under the membrane, any point on the membrane must be reachable by an air hole with a maximum distance of 15 µm in-between.

Another aspect of the invention, wherein membrane on a chip carrier with gold electrical paths and gold wirebond between them.

Another aspect of the invention, wherein dimensions of the membrane design are,

Substrate thickness ($t_{subs}$) is >650 µm
Membrane diameter ($d_{membrane}$) is 1000 µm
hole-to-hole diameter ($d_{HOLE-TO-HOLE}$) is 50 µm
dimple diameter ($d_{dimple}$) is 12 µm
hole diameter ($d_{hole}$) is 36 µm
metal thickness ($t_{metal}$) is 0.51 µm
POLY2 thickness ($t_{poly2}$) is 1.5 µm
Dimple thickness ($t_{dimple}$) is 0.75 µm
POLY1 thickness ($t_{poly1}$) is 2.0 µm
POLY0 thickness ($t_{poly0}$) is 0.51 µm
SiN thickness ($t_{SiN}$) is 0.61 µm.

Another aspect of the invention, wherein the MEMS device is remotely driven and controlled by laser power.

Another aspect of the invention, wherein the power of the laser beam is converted into a voltage source that will control the MEMS device via the photodiode integrated with the MEMS device.

BRIEF DESCRIPTION OF THE DRAWINGS

The figures used to better explain fiber optic MEMS microphone developed with this invention and their descriptions are as follows:

FIG. 12B Spatial response of the membrane to one cycle of sine pulses at 28 kHz (transient)

FIG. 12C Spatial response of the membrane to one cycle of sine pulses at 51 kHz (transient)

FIG. 12D Spatial response of the membrane to one cycle of sine pulses at 109 kHz (transient)

DETAILED DESCRIPTION OF THE EMBODIMENTS

The present invention has been described in detail in the following. This invention offers a new aspect for the design of MEMS membrane for optical microphones.

In this section, a novelty is going to be demonstrated.

Figure 1B:
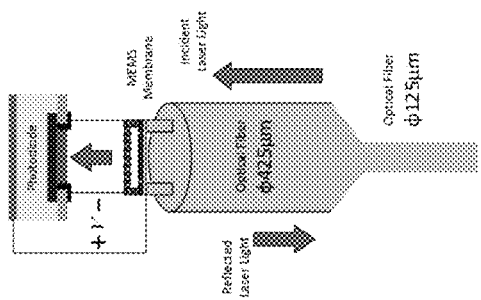
FIG. 1A A laser-powered active MEMS-based fiber-optic acoustic sensor-microphone showing Fabry Perot interferometer measurement system FIG. 1B A laser-powered active MEMS-based fiber-optic acoustic sensor-microphone showing photodiode supplied active MEMS fiber optic microphone structure FIG. 2 Cross-sectional view of the MEMS membrane design FIG. 3A Electrical impedance measurements of MEMS structure showing the membrane on the chuck of the probe station as shown FIG. 3B Electrical impedance measurements of MEMS structure showing the microscope view taken from the probe station as shown FIG. 4A Displacement measurements of MEMS structure using laser vibrometer FIG. 4B Displacement measurements of MEMS structure using laser vibrometer FIG. 5A The top view of the membrane showing a polysilicon layer of the membrane with air holes FIG. 5B The top view of the membrane showing a zoomed view of the membrane which shows the air holes and dimples FIG. 6 Hole arrangement for optimum membrane design FIG. 7 Electrical characterization setup FIG. 8 Optical characterization setup FIG. 9 Deflection of the membrane as a function of frequency FIG. 10 Average displacement over selected area for different radial distances from the membrane FIG. 11A The analysis of the symmetry of the membrane. Response of two points that are separated by 50 µm from the center of the membrane FIG. 11B The analysis of the symmetry of the membrane. Response of two points that are separated by 150 µm from the center of the membrane FIG. 11C The analysis of the symmetry of the membrane. Response of two points that are separated by 250 µm from the center of the membrane FIG. 11D The analysis of the symmetry of the membrane. Response of two points that are separated by 350 nm from the center of the membrane FIG. 12A Spatial response of the membrane to the CW inputs at 28 kHz, 51 kHz and 109 kHz (steady-state)
Figure 1A:
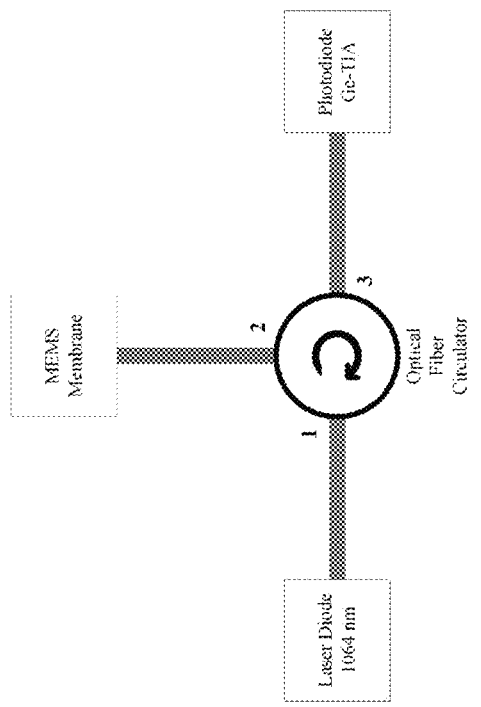

Our invention is a laser-powered active MEMS-based fiber-optic acoustic sensor-microphone (FIGS. 1A and 1B). The MEMS device is integrated with an optical fiber cable end structure and a photodiode chip. A portion of the laser beam from the fiber optic cable passes back through the MEMS substrate and membrane to form a Fabry-Perot interference and go to the fiber optic interferential motion sensor. The remaining part of the incoming laser beam illuminates the photodiode chip, creating the electrical power to activate the MEMS device. By changing the laser beam power, the MEMS device is driven at different voltage values. In this way, it is possible to obtain adjustable MEMS fiber optic microphone devices with high transfer factor and dynamic response intervals. The 1064 nm value for the laser operation wavelength is chosen because this wavelength can pass the MEMS device with a low loss of silicon substrate structure and illuminate the InGaAs P-I-N photodiode that will drive the MEMS device.

MEMS membrane, Laser diode, photodiode Ge-TIA and optical fiber circulator are shown in FIG. 1A. Laser diode which is shown in FIG. 1A as a 1064 nm value. MEMS membrane, photodiode, reflected laser light, incident laser light and Optical fiber are shown in 1b. Optical fiber which is shown in FIG. 1B as a Φ125 µm and Φ425 µm.

MEMS fiber optic microphones have a vibrating diaphragm that corresponds to the acoustic sound wave. This diaphragm is not in any way an electrically controllable structure, i.e. it is passive. The diaphragm resonance frequencies are constant. With the fiber optic cable, the intensity or phase modulation of the incoming light is determined by the displacement of the diaphragm corresponding to the sound wave. In general, different materials of the diaphragm structure or diaphragm surface corrugation shapes are tried to increase sensitivity.

In our invention, the displacement of the large perforated membrane (FIG. 2) corresponding to the sound waves in the active MEMS-based fiber optic acoustic microphone is determined by phase modulation of the light. This allows the membrane to adjust its sensitivity to sound waves.

1) The MEMS device is remotely driven and controlled by laser power. The laser beam from the fiber optic cable is used both as a remote power transfer and as an acoustic signal sensor via the MEMS device. The power of the laser beam is converted into a voltage source that will control the MEMS device via the photodiode integrated with the MEMS device. In the literature, a MEMS study activated by laser power was not found.

2) In the active MEMS-based fiber-optic acoustic sensor, the control range of the MEMS membrane against acoustic stimulation and the sensitivity of the measuring system are adjusted by controlling the bias of the MEMS device in the microphone. This results in a wider dynamic response range than conventional MEMS fiber optic microphones. In the literature research, no MEMS fiber optic microphone working with active power supply has been found.

3) The MEMS device is integrated with an optical fiber cable end structure and a photodiode chip. The laser beam from the fiber optic cable will be used both as a remote power transfer and as an acoustic signal sensor via the MEMS device. A study using laser beam for remote power transfer in a sensor system has not been found in the literature.

Light is used not only for displacement, but also for energy transmission. The presence of an active membrane in which we can adjust the resonance frequency during use with this energy transmission is particularly important for microphones operating in a very wide frequency range (20 Hz to 20,000 Hz).

Membrane of a fiber-optic MEMS microphone is the sensing element of it. The design of membrane concerns several issues such as the reproducibility, durability, stable performance of the membrane. These issues are addressed to the microfabrication process. Based on commercially available multi-user multi-processes (MUMPS) offered by foundries, POLYMUMPS process (MEMSCAP Inc., France) is selected due to its suitability for microfabrication of airborne membranes supported by the non-limiting process design rules for our intended microphone application. Furthermore, reproducibility and consistency of this mature process is considered to be advantageous for the realization of high fidelity membrane, which is of utmost importance for the optical phase detection of light.

This process is based on polysilicon layers. The ability to design membranes and the ability to etch sacrificial oxide layers under the polysilicon layers makes this process valuable for our design. Obtain perfect etching of sacrificial oxide layers requires placement of holes in the polysilicon layers. The distance between any etching holes cannot be larger than 30 µm. In our design, we also take into account the process variations in the design of our membrane. On top of the membrane, we put metal layer for the reflection of light from the membrane. $CO_2$ dry etch in addition to the standard HF wet etch for oxide removal is used. $CO_2$ dry is used to prevent the stiction of the adhesion between the membrane and the substrate for the large aspect ratio used in the membrane (1:500). Very low compressive stress (<7 MPa) of POLY2 membrane material with a thickness of 2 µm and very low tensile stress (<24 MPa) of METAL coverage of 0.51 µm on the membrane results in an almost ideal compensation of stress resulting an equivalent stress less than 1 MPa[11]. This makes our large aspect-ratio membrane having negligible curvature due to residual stress. The diameter of the membrane is adjusted to obtain high response in the audible frequency range. The formula given by Equation 1 is used[12]. This formula gives the first resonance frequency of a circular membrane by taking the membrane material properties and the membrane dimensions into account. For this design, the material properties and required dimensions are taken from the MEMSCAP.[12]

$$f \cong \frac{20.42}{\pi a^2} \sqrt{\frac{D}{h\rho}}, D = \frac{Eh^3}{12(1-\mu^2)} \quad (1)$$

where a is the diameter, h is the thickness, p is the mass density, which is taken as 2330 kg/m³, E is the Young's Modulus, which is taken as 169 GPa, and µ is the Poisson's ratio, which is taken as 0.22, of the membrane.

Since the detection of audible signals in 20 Hz-20 kHz frequency band is desired, the resonance frequency that is slightly above the upper limit of this band is required.

The resultant design of the membrane consists of a polysilicon membrane with air holes and it is called as a meshed-structured membrane. The top view of the membrane is shown in FIGS. 5A and 5B.

Figure 6:
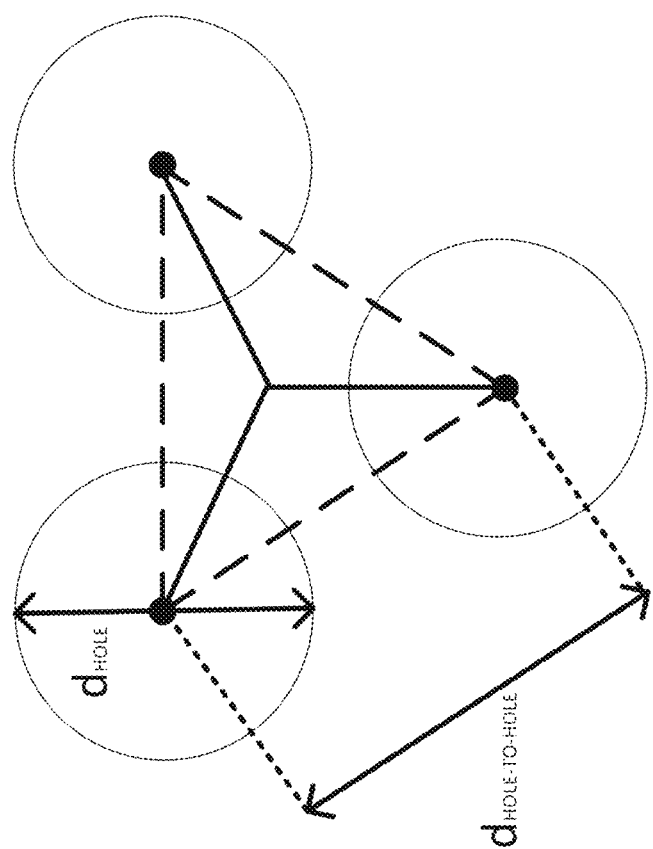

The diameter of air holes and dimples are set to 36 µm and 12 µm, respectively. The distance between the centers of two air holes is determined according to the design rules. To obtain sufficiently large oxide etch under the membrane, any point on the membrane must be reachable by an air hole with a maximum distance of 15 µm in-between by design rules. The geometric problem that is solved is represented in FIG. 6.

The design is fully symmetric, and the holes and their separations are identical in both directions on the membrane. There are two variables in this design, the diameter of the holes and the distance between the centers of the holes. Since the placement of holes is fully symmetric, an equilateral triangle is obtained with the corners taken as any three air hole centers. After calculations, it is found that $2d_{HOLE-TO-HOLE} - \sqrt{3}d_{HOLE} \leq 30\sqrt{3}$µm. Another objective is to maximize the fill factor. Fill factor (FF) of the design is given as $$FF = 1 - \frac{\pi}{2\sqrt{3}} \left( \frac{d_{HOLE}}{d_{HOLE-TO-HOLE}} \right)^2.$$

Since the amount of the light reflected from the membrane should be sufficiently large for the detection of the displacement of the membrane, at least 50% fill factor is aimed. Therefore, the constraint becomes $$\frac{d_{HOLE}}{d_{HOLE-TO-HOLE}} < 0.75.$$

To optimize both constraints, $d_{HOLE}=36$ µm and $d_{HOLE-TO-HOLE}=50$ µm are chosen with safety margins. In this case, the fill factor becomes 53% and hole-to-hole distance becomes 50 µm. The maximum distance between any point on the membrane and the air hole is 14 µm.

Figure 2:
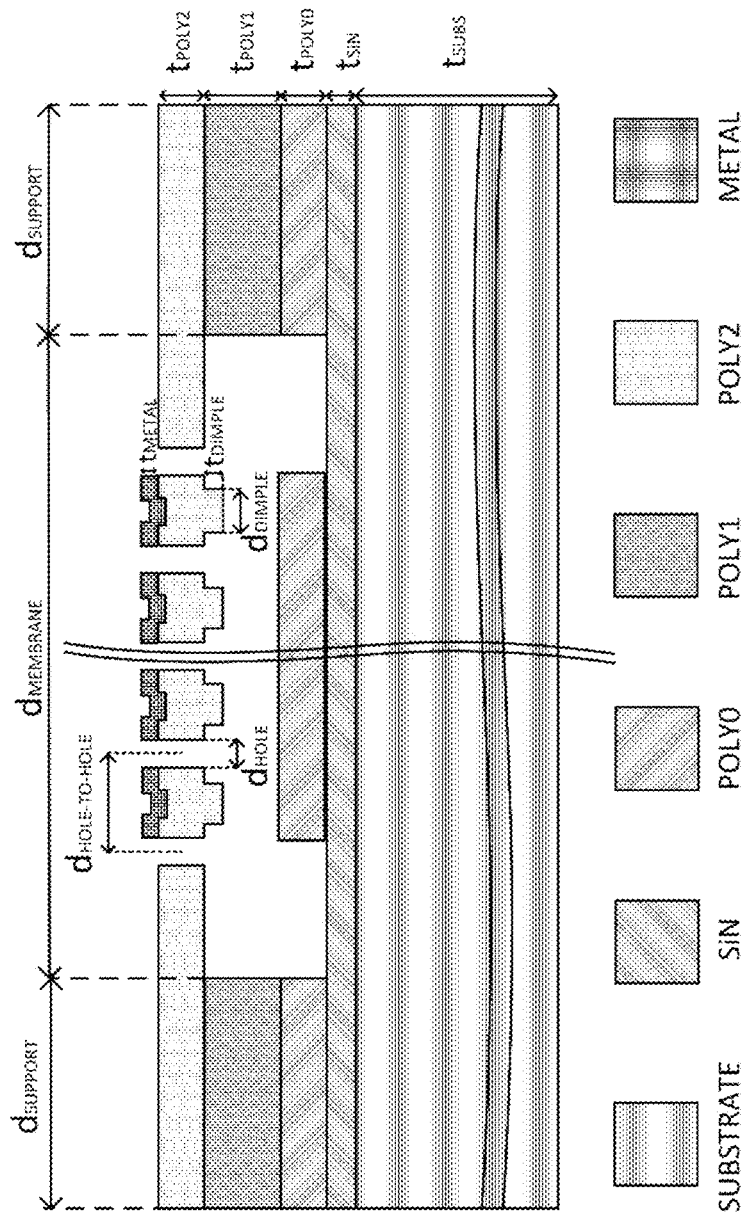

The cross-sectional view of the resultant is shown in FIG. 2 and the values of the parameters in this figure are given in Table I.

TABLE I

Values of the representative dimensions of the design.

| Dimension parameter | Value |
|---|---|
| Membrane diameter ($d_{MEMBRANE}$), µm | 1000 |
| Support length ($d_{SUPPORT}$), µm | 150 |
| Hole-to-hole diameter ($d_{HOLE-TO-HOLE}$), µm | 50 |
| Dimple diameter ($d_{DIMPLE}$), µm | 12 |
| Hole diameter ($d_{HOLE}$), µm | 36 |
| Metal thickness ($t_{METAL}$), µm | 0.51 |
| POLY2 thickness ($t_{POLY2}$), µm | 1.5 |
| Dimple thickness ($t_{DIMPLE}$), µm | 0.75 |
| POLY1 thickness ($t_{POLY1}$), µm | 2.0 |
| POLY0 thickness ($t_{POLY0}$), µm | 0.51 |
| SiN thickness ($t_{SiN}$), µm | 0.61 |
| Substrate thickness ($t_{SUBS}$), µm | >650 |

Electrical and Optical Measurement Setup

Figure 7:
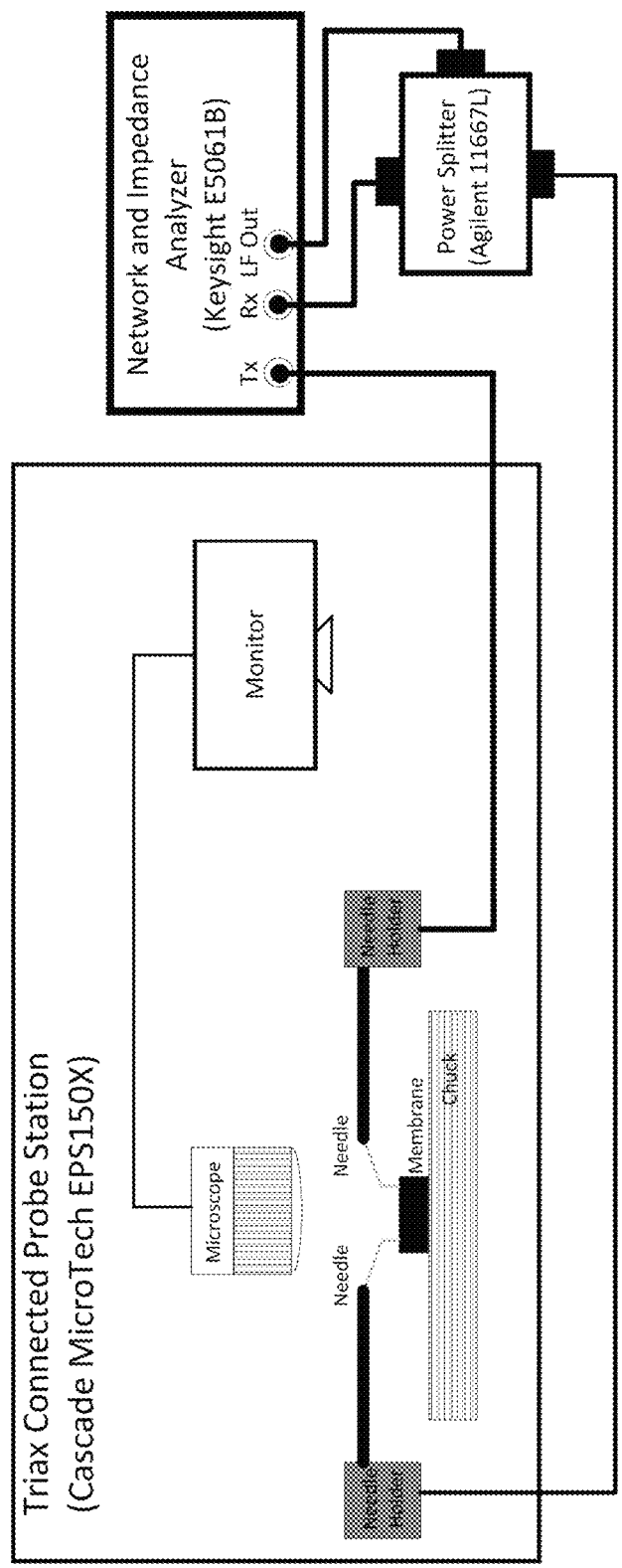

To characterize and verify the performance of the microfabricated MEMS membrane, electrical impedance and optical laser vibrometer measurements are employed. Cumulative response of the whole membrane is achieved via electrical whereas spatial response of spots as small as 2 µm can be collected via optical measurements. To characterize the membrane electrically, network and impedance analyzer (5061B, Keysight Technologies, California, USA) and triax connected probe station (EPS150X, Cascade MicroTech, Oregon, USA) are used as shown in FIG. 7. Series Gain-Phase mode using LF-Out port is used.

In this setup, membrane is placed on the chuck of the probe station. Electrical connections from ground and signal pads of the MEMS chip are made using tungsten needles (PTT-120-/4-25, Cascade MicroTech, Oregon, USA) followed by triax-to-BNC adapter to network and impedance analyzer. A power splitter (Agilent 11667L) is used to connect the device to the network analyzer properly to implement the suggested configuration of low frequency measurement of high impedance device.

The series capacitance ($C_s$) and series resistance ($R_s$) measurements are taken to detect any resonance frequency in the frequency range of 1 kHz-100 kHz. During measurements Intermediate Frequency Band Width (IFBW) is set to 500 Hz with an averaging of 32. 10 dBm ($1V_{peak-to-peak}$) sinusoidal signal is used and 1601 data points are taken in the given frequency range. DC voltage is changed from 0 V up to 3 V.

Figure 8:
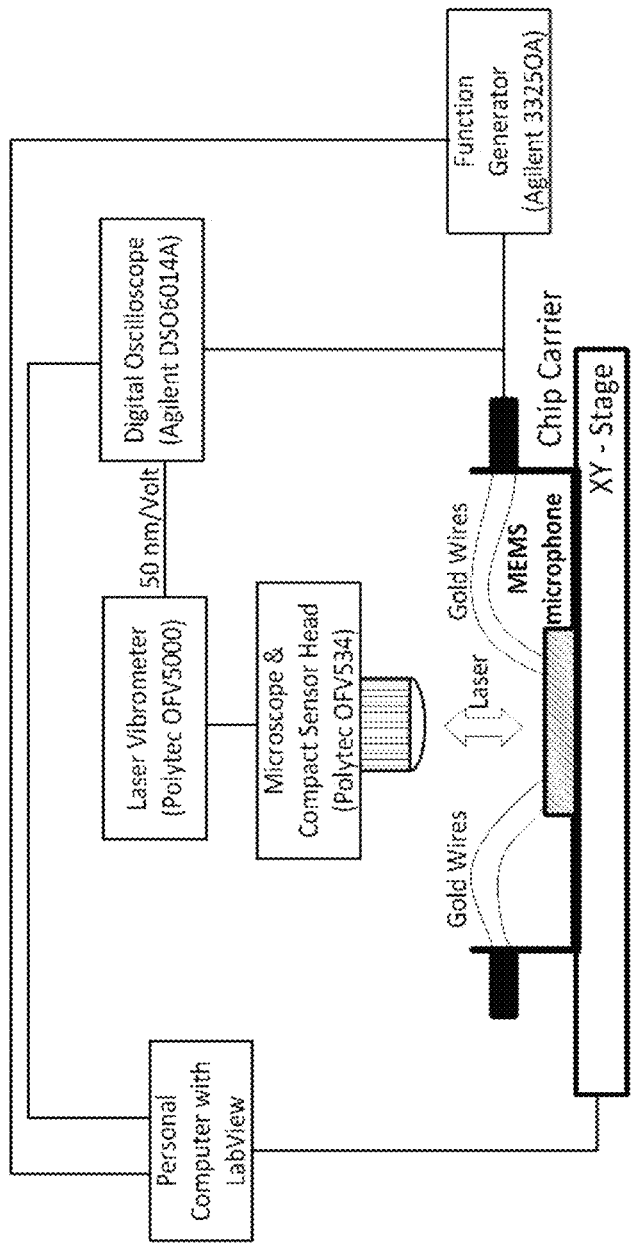

Optical characterization is done with the setup as shown in FIG. 8. Laser Vibrometer (OFV5000, Polytec, Germany) is used together with the digital oscilloscope (DSO6014A, Agilent, California, USA), the function generator (33250A, Agilent, California, USA) and a personal computer with LabView (National Instruments, Texas, USA) on it to control the devices in the setup.

Optical characterization is based on the detection of the displacement of the MEMS membrane as a result of the electrical excitation. A laser light at 633 nm wavelength is sent to the membrane and the reflected light is used to understand the deflection of the membrane via the interferometer that is utilized between the membrane and the laser light. In fact, this way of displacement measurement is very similar to the way that is used in fiber optic microphones.

To generate an acoustical pressure on the membrane, the electrical excitation is done by a function generator which generates 0.1 V peak-to-peak sinusoidal signal with a DC bias voltage of 1 V. The excitation frequency is swept from 3 kHz to 150 kHz. Besides the general response of the membrane, this optical characterization setup enables the spatial inspection of the membrane. In other words, by directing the laser light on different points on the membrane, spatial response of the membrane to any excitation can also be obtained.

Results

Figure 3B:
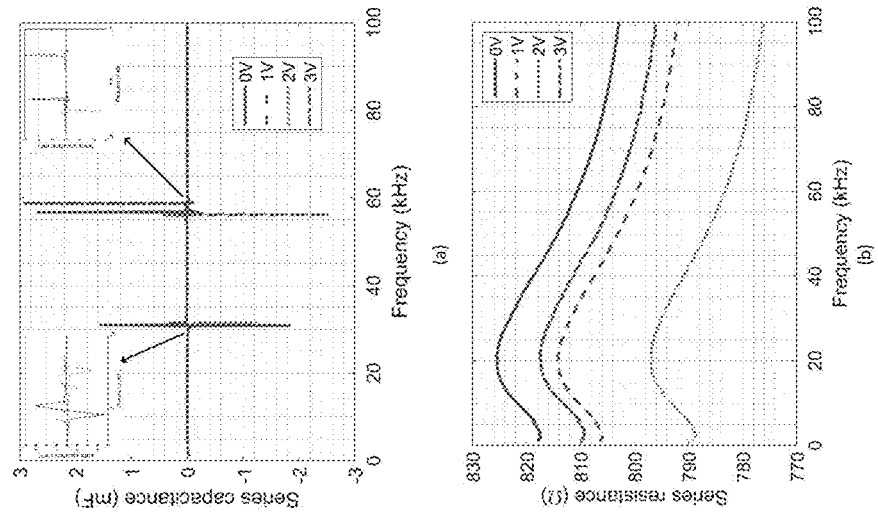
Figure 3A:
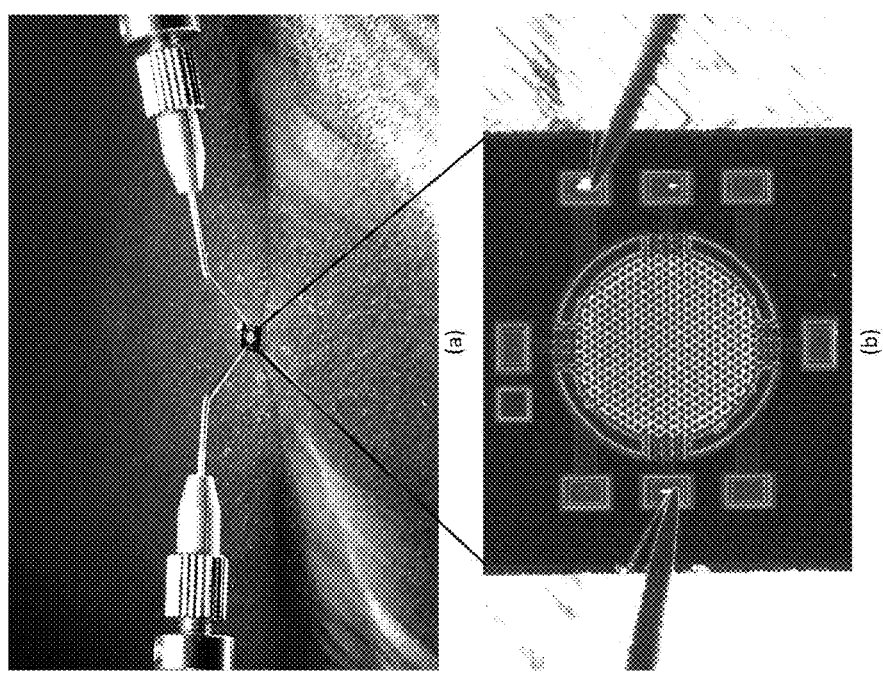

The electrical characterization setup is prepared by putting the membrane on the chuck of the probe station as shown in FIG. 3A. By using needles, electrical connections are utilized. The microscope view taken from the probe station is as shown in FIG. 3B.

To avoid the collapse of the membrane on the ground plate, maximum of 3V DC bias is applied between the plates of the microphone. The measured $C_s$ and $R_s$ values are shown in FIGS. 3A and 3B. Two resonance frequencies are observed at 30 kHz and 56 kHz, respectively.

In optical measurement setup, the membrane is placed in a chip carrier as shown in FIG. 4B and the electrical pads are connected to electrically conductive gold lines on the chip carrier by gold wire bonds as shown in FIG. 4B. Chip carrier has two SMA (SubMiniature version A) connectors which are used to excite the membrane electrically through its pads. The signal generator is connected to the MEMS device and it is also connected to the oscilloscope as a triggering signal for the output of the vibrometer.

In the optical measurement, all data were taken from 21 points on the membrane to understand its overall response as well as its spatial response. Those 21 points are 50 µm apart from each other with the 11th point at the center of the membrane as shown in FIG. 4A. Input frequency is swept from 3 kHz to 150 kHz with a continuous wave (CW) sinusoidal excitation. The response of the membrane in both spatial and frequency domains are shown in FIG. 4B. It is observed that there are three resonance frequencies at 28 kHz, 51 kHz and 109 kHz. Region around the center of the membrane gives the highest response to any input.

Figure 9:
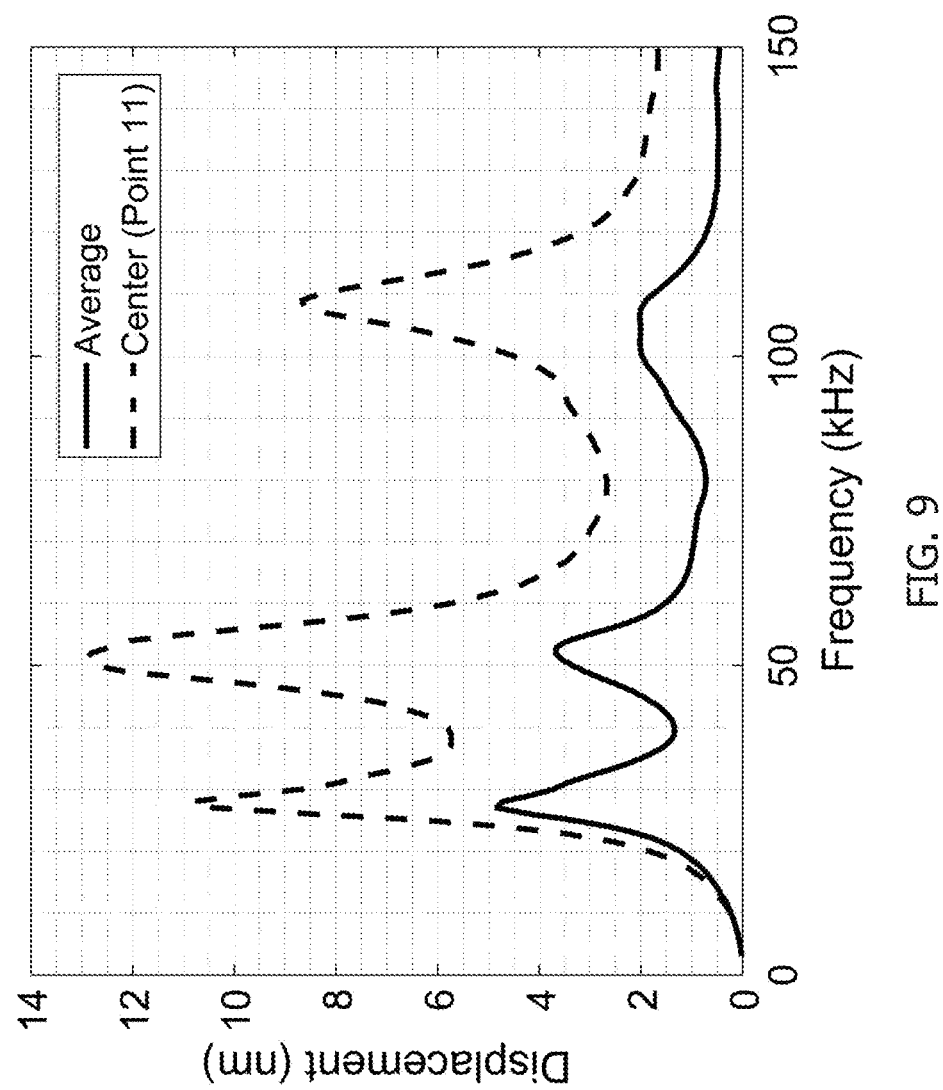

Total response of the membrane considering the amount of deflection is also obtained by processing the spatial data. The overall response and the response of the central point are shown in FIG. 9. At 28 kHz, the average displacement of the membrane is 5 nm in average and 10 nm in the center. The fractional 3-dB bandwidth of this resonance is 32%.

Figure 10:
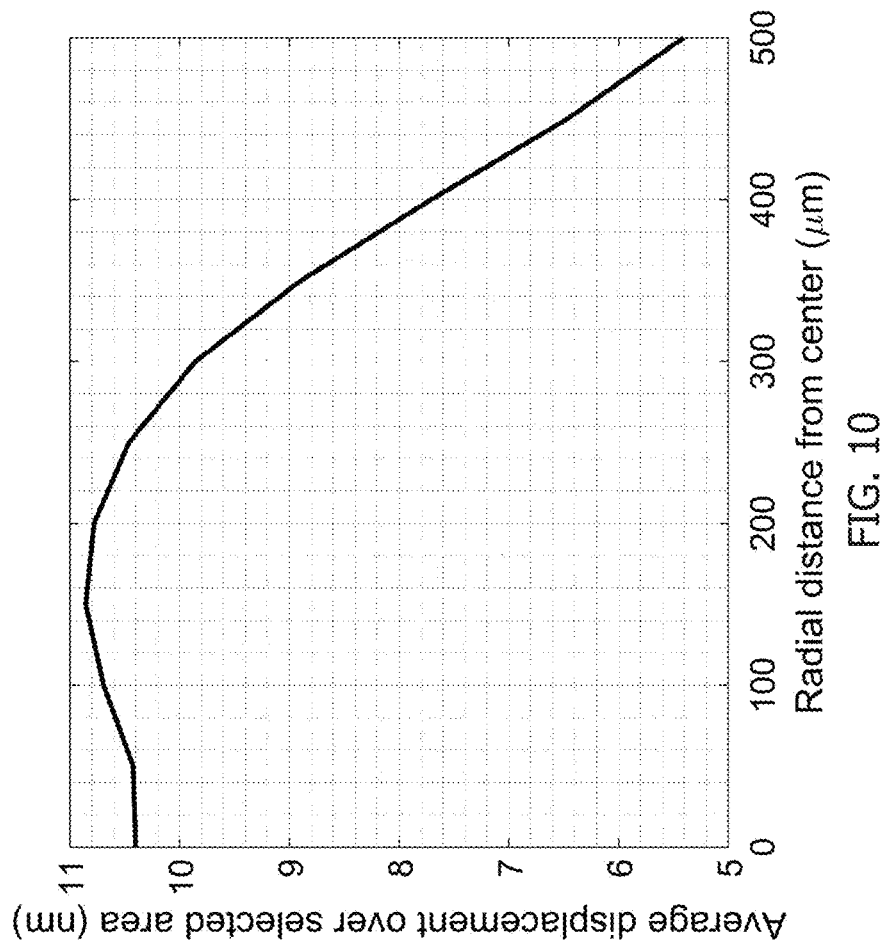
Figure 11A:
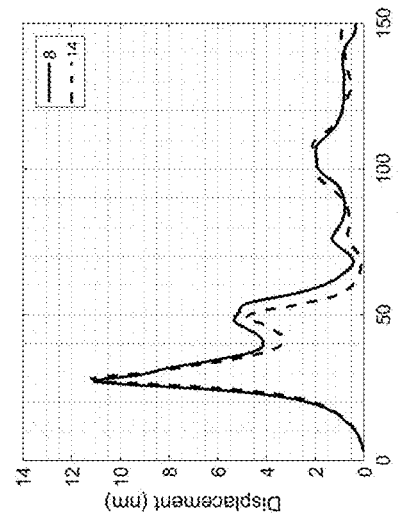
Figure 11B:
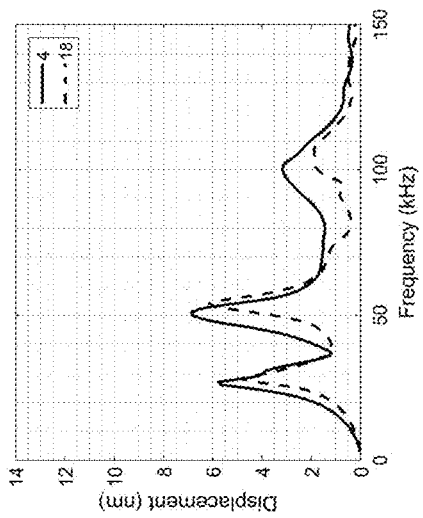
Figure 11C:
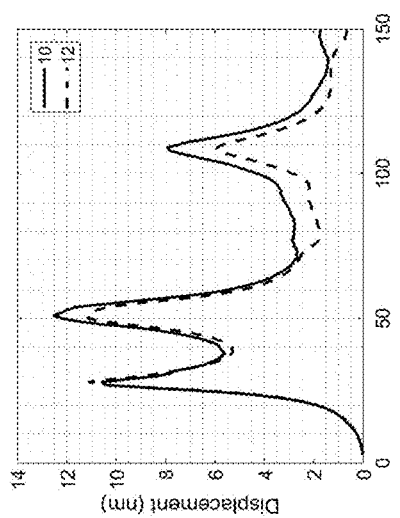
Figure 11D:
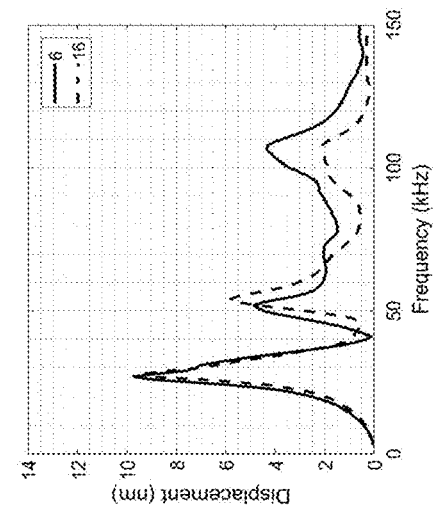

To determine where to focus the laser light to obtain the maximum deflection per area the responses of data points at 28 kHz are analyzed. Average displacement over selected area is obtained for different radial distances from the center of the membrane and the resultant characteristics is shown in FIG. 10. The optimum area to focus the light has a radius of 150 µm. The average displacement is almost constant for circular areas with radius ranging from 50 µm to 250 µm.

To analyze the symmetry in the response of the membrane, the data from the points that are 50 µm, 150 µm, 250 µm and 350 µm distant from the center of the membrane are used. This characteristics is shown in FIGS. 11A-D.

For the points that are 50 µm distant from the center of the membrane, it is realized that their peak responses are at the same frequencies. This situation occurs also for 100 µm distant points. For 250 µm distant points, the location of the second resonance frequency changes slightly by 3.8%. Further small deviations are observed for 350 µm distant points. The first, second and third resonance frequencies change by 3.6%, 5.9% and 4%, respectively.

The spatial steady state responses of the membrane to the input signals at 28 kHz, 51 kHz and 109 kHz are shown in FIG. 12A. To obtain the temporal transient response of the membrane, single cycle sinusoidal signals at the resonance frequencies, 28 kHz, 51 kHz and 109 kHz are used. The responses are as shown in FIGS. 12B-D. It is observed that the transient response of the membrane to the input at 28 kHz has longest ringing response. All of the transient responses decay with time. Electrical characterization is applicable to the membrane since it can be modelled as a series capacitor and a series resistor. A parallel plate capacitor can be visualized by considering the membrane and the substrate as parallel plates. In the design of the microphone, a 450 µm-radius, 0.5 µm-thick polysilicon layer is added on the substrate which is just below the membrane by 2 µm. This part is called the ground plate and it is connected to the ground pads by polysilicon lines. The movable membrane is also connected to the signal pads via polysilicon lines.

From electrical measurements as shown in FIGS. 3A and 3B, first resonance frequency at 30 kHz is close to the expected one which was calculated from the Equation (1) as 26 kHz. From series capacitance data, it is observed that this frequency changes from 29.4 kHz to 30.6 kHz when the applied DC voltage is changed from 0V to 3V. The resonance frequency is observed around 56 kHz and it changes by 3 kHz with the applied DC voltage. Therefore, the resonance frequency of the membrane is fine tunable with the applied DC voltage. From 0V to 2V, the first resonance frequency increases by 750 Hz which may be due to the stress stiffening and from 0V to 3V, it decreases by 250 Hz which may be due to the effect of spring softening dominating stress stiffening[14].

The measured capacitance values in FIG. 3A are not actual capacitance values of the MEMS membrane, which is theoretically calculated to be 1.4 pF, due to the effects of cabling and lack of calibration at the end of probes. They only show the existence of resonance frequencies, and high capacitance values indicate that the resonances around 30 kHz and 56 kHz are strong. The measured resistance values are relatively high due to the resistive lightly-doped polysilicon lines compared to the highly conductive metal.

Modal shapes of the resonances are shown in FIG. 4B. It can be observed that the first resonance frequency is the fundamental resonance frequency since it has no nulls in its mode shape. The second resonance frequency at 51 kHz and the third resonance frequency at 109 kHz has one and two nulls along the radial direction as expected, respectively. This data supports that these are the first three resonances of the membrane.

In addition to the operation of the device around 28 kHz, from FIG. 4B, this membrane can be used to operate at 58 kHz and 109 kHz. By focusing the light on circular areas with 150 µm and 100 µm radius, this membrane can operate at 58 kHz and 109 kHz, respectively.

If the parallel plate capacitor assumption is used, the applied voltage can be used to model the force acting on the plates of the capacitor, namely the membrane. This information is valuable since the membrane is required to respond sound pressure. From the average displacement data in FIG. 9, this calculation is done by $$P = \frac{1}{2}\varepsilon E^2 = \frac{1}{2}\varepsilon \left(\frac{V}{d_{eff}}\right)^2$$

formula which represents the amount of pressure that acts on the plates of a parallel plate capacitor. In this formula, $\varepsilon$ is actually $\varepsilon_0$, which is the permittivity of free space, and gap between the plates and 1.25 μm for the regions with dimples. First, the gap between the plates should be calculated. For a parallel plate capacitor, deflection of the plate as a function of applied voltage is given as $$V_n^2 = \frac{27}{4}x_n(1-x_n)^2,$$

where $$V_n = \frac{V}{V_{collapse}}, V_{collapse}$$

being the collapse voltage of the membrane, $$x_n = \frac{x}{d_{eff}}, d_{eff}$$

being the effective gap between the plates of the capacitors[13]. In this design, $V_{collapse}$ is observed to be larger than 3V. $d_{eff}$ can be calculated from different regions of the membrane, namely the polysilicon region with dimples, region-1 and the polysilicon regions without dimples, region-2. The air gap of region-1 is $g_1$=1.25 μm and the air gap of region-2 is $g_1$=2 μm. Effective gap can be calculated by $$\frac{1}{9}\left(\frac{1}{g_1}\right)^2 + \left(\frac{1}{g_2}\right)^2 = \frac{10}{9}\left(\frac{1}{d_{eff}}\right)^2$$

resulting in $d_{eff}$ being 1.86 μm. If we insert this value into the equation, we can find that for 1V DC bias, as in the optical measurement setup, $x_n$=0.01 which results in x=18.6 nm. Since this value is negligible compared to $d_{eff}$=1.86 μm, it can be ignored. The applied voltage is the sum of DC and ac voltages as $V=V_{DC}+V_{ac}\cos(wt)$. By taking square of it, we obtain three terms: the purely DC term, which is already responsible for the change of the effective gap between the plates, the ac term with frequency two times the excitation frequency, which is neglected and the ac term with frequency same as the excitation frequency. This final term should be used in the pressure formula. By taking $d_{eff}$=1.86 μm, it is found that the average displacement per pressure of the membrane at 28 kHz is approximately 40 nm/Pa. Highly reflective surface and high pressure sensitivity of the membrane make it suitable for microphone applications. The average displacement of the membrane is predicted to be increase with the larger DC bias voltages. Therefore, operating this device around 3V DC bias gives the highest response and this makes the detection of the displacement easier. The area that the laser light to be spotted is important since width of the light beam increases with distance. The amount of power that is coupled to the fiber after reflection starts decreasing after the critical width of the beam which is equal to the diameter of the fiber. By taking the distance light travels constant, the only parameter to change is the width of the beam when it hits the membrane. This width should be large enough to obtain the sufficient amount of deflection information from the membrane. From FIG. 10, the optimum width is calculated as 300 μm (150 μm-radiues circle). Therefore, focusing light to the area with 150 μm radius would be the best solution considering both the sensitivity and the amount of light that couples back to the fiber. The membrane shows a highly symmetric response within the area with radius 250 μm as shown in FIGS. 11A-D. The symmetry can also be verified from the transient response of the membrane to the one cycle sinusoidal excitations as shown in FIGS. 12B-D. From symmetry property, the central operation of the membrane is verified; the membrane has circular symmetry with respect to the center of it.

The characteristics of a custom designed 1300 μm×1300 μm featuring 1.5 μm-thick, 1000 μm-diameter MEMS membrane with 36 μm-diameter air holes which is designed as the sensing element for a fiber optic microphone is microfabricated by POLYMUMPS process and its characteristics are investigated. Air holes are used in the design to obtain sacrificial etch of oxide layers under the membrane. These holes are designed such that the fill factor of the design is 53%. The surface of the membrane is gold-coated which utilizes a reflective surface for the light. The resonance frequencies of the design are obtained by electrical and optical measurement setups. The fundamental resonance frequency of the design changed by 3% with the change of the applied dc voltage from 0V to 3V. Higher order modes are also observed and the center of the membrane gives strong response also to the higher modes. The response of the design is spatially symmetric and the mode shapes suggests that the resonance at 28 kHz is the fundamental mode of the membrane. By obtaining the resonance frequency slightly above the audible frequency range, strong response and almost no phase reversal have achieved. High sensitivity of the design, 40 nm/Pa, makes it suitable for fiber optic microphones. High circular symmetry of the membrane is also important due to the circular spots of laser lights. This design also offers the flexibility of selecting the area to focus light on the membrane since it gives almost the same response within the 250 μm-radius area. By the characteristics of the membrane, this design is verified to be suitable for fiber optic microphones.

From the above detailed description, a fiber optic MEMS microphone, comprising;
  A MEMS device integrated at the end of an optical fiber cable,
  A photodiode chip placed on top of the MEMS device,
  Voltage generated by the photodiode chip which is electrically wired to the SIGNAL and GND pads of the MEMS device,
  The MEMS device which is capable of reflecting part of the incident laser light from the membrane back to the optical fiber whereas allowing the remaining part of the incident laser light transmit through the membrane onto the photodiode chip,
  The MEMS device which features a membrane coated with optically reflective material that reflects the incident laser light, The MEMS device which features a membrane having air holes that transmit the incident laser light, Power adjustable laser beam by laser diode which is biasing the MEMS device at different voltage values, Light which is used for detection of the membrane displacement via phase modulation or intensity modulation of the incident laser light, Light which is also used in energy transmission through the optical fiber for the generation of voltage across the photodiode chip.

REFERENCES

[1] Chonghua Zhou, Stephen V. Letcher, and Arun Shukla, "Fiber-optic microphone based on a combination of Fabry-Perot interferometry and intensity modulation", The J. Acoust. Soc. Am., 98, 1042 (1995).

[2] Ming Li, Ming Wang, "Optical MEMS pressure sensor based on Fabry-Perot interferometry", Optics Express, Vol. 14, No. 4 (2006).

[3] Ji-Huan Chen, Xu-Guang Huang, Jia-Rong Zhao, Jin Tao, Wei-Xin He, Song-Hao Liu, "Fabry-Perot interference-based fiber-optic sensor for small displacement measurement", Optics Communications 283, 3315-3319 (2010).

[4] J. A. Bucaro, H. D. Dardy, and E. F. Carome, "Fiber-optic hydrophone", J. Acoust. Soc. Am., 62, 1302 (1977).

[5] Qingxu Y U and Xinlei ZHOU, "Pressure Sensor Based on the Fiber-Optic Extrinsic Fabry-Perot Interferometer", Photonic Sensors Vol. 1, No. 1: 72-83 (2011).

[6] G. C Fanga, P. G Jia, Q. Caoa, and J. J Xiong, "MEMS Fiber-optic Fabry-Perot pressure sensor for high temperature application", Proc. of SPIE Vol. 10155, 101552H (2016).

[7] Zhenfeng Gong, Ke Chen, Xinlei Zhou, Yang Yang, Zhihao Zhao, Helin Zou, and Qingxu Yu, "High Sensitivity Fabry-Perot Interferometric Acoustic Sensor for Low-Frequency Acoutic Pressure Detections", J. Lightwave Tech., Vol. 35, No. 24 (2017).

[8] Yu Wu, Caibin Yu, Fan Wu, Chen Li, Jinhao Zhou, Yuan Gong, Yunjiang Rao, Yuanfu Chen, "A Highly Sensitive Fiber-Optic Microphone Based on Graphene Oxide Membrane", J. Lightwave Tech., Vol. 35, No. 19 (2017).

[9] Bin Liu, Han Zhou, Lei Liu, Xing Wang, Mingguang Shan, Peng Jin, Zhi Zhong, "An Optical Fiber Fabry-Perot Microphone Based on Corrugated Silver Diaphragm", IEEE Transactions on Instrumentation and Measurement, Vol. 67, No. 8 (2018).

[10] Xueqi Lu, Yu Wu, Yuan Gong, Yunjiang Rao, "A miniature fiber-optic microphone based on annular corrugated MEMS diaphragm", J. Lightwave Tech., doi: 10.1109/JLT.2018.2868964 (2018).

[11] Steve T. Cho, Khalil Najafi, Kensall D. Wise, "Internal Stress Compensation and Scaling in Ultrasensitive Silicon Pressure Sensor", IEEE Transaction on Electron Devices Vol. 39, No. 4 (1992).

[12] M. Giovanni, Flat and Corrugated Diaphragm Design Hand-book (1982).

[13] G. G. Yaralioglu, A. S. Ergun, B. Bayram, E. Haeggstrom and B. T. Khuri-Yakub, "Calculation and measurement of electromechanical coupling coefficient of capacitive micromachined ultrasonic transducers,", IEEE Transactions on Ultrasonics, Ferroelectrics, and Frequency Control, vol. 50, no. 4, pp. 449-456, (2003).

[14] I. O. Wygant, M. Kupnik and B. T. Khuri-Yakub, "Analytically calculating membrane displacement and the equivalent circuit model of a circular CMUT cell,", IEEE Ultrasonics Symposium, Beijing, 2008, pp. 2111-2114, (2008).

What is claimed is:

1. A fiber optic MEMS microphone, comprising:
a MEMS device integrated at an end of an optical fiber cable,
a photodiode chip placed on a top of the MEMS device,
a voltage generated by the photodiode chip, wherein the photodiode chip is electrically wired to SIGNAL and GND pads of the MEMS device,
wherein the MEMS device reflects a part of an incident laser light from a membrane back to the optical fiber cable, and allows a remaining part of the incident laser light to transmit through the membrane onto the photodiode chip,
the membrane is coated with an optically reflective material for reflecting the incident laser light,
the membrane has air holes for transmitting the incident laser light,
a power adjustable laser beam by a laser diode, wherein the laser diode is biasing the MEMS device at different voltage values,
wherein a light is used for a detection of a membrane displacement via a phase modulation or an intensity modulation of the incident laser light, and
the light is also used in an energy transmission through the optical fiber cable for a generation of the voltage across the photodiode chip.

2. The fiber optic MEMS microphone according to claim 1, wherein the MEMS device is respectively comprising of a METAL, a POLY2, a POLY1, a POLY0, a SiN, and a Si substrate from the top to a bottom of the MEMS device.

3. The fiber optic MEMS microphone according to claim 1, wherein a diameter of each of the air holes and a diameter of a dimple are set to 36 μm and 12 μm.

4. The fiber optic MEMS microphone according to claim 1, wherein the photodiode chip is a Ge-TIA photodiode or an InGaAs P-I-N photodiode.

5. The fiber optic MEMS microphone according to claim 1, wherein a value for a laser operation wavelength is 1064 nm.

6. The fiber optic MEMS microphone according to claim 1, wherein a displacement of a perforated membrane corresponding to sound waves in an active MEMS-based fiber optic acoustic microphone is determined by the phase modulation of the incident laser light.

7. The fiber optic MEMS microphone according to claim 1, wherein the power adjustable laser beam from the fiber optic cable is used both as a remote power transfer and as an acoustic signal sensor via the MEMS device.

8. The fiber optic MEMS microphone according to claim 1, wherein a control range of the membrane against an acoustic stimulation and a sensitivity of a measuring system are adjusted by controlling a bias of the MEMS device in the fiber optic MEMS microphone.

9. The fiber optic MEMS microphone according to claim 1, wherein to obtain an oxide etch under the membrane, a point on the membrane must be reachable by an air hole with a maximum distance of 15 μm in-between.

10. The fiber optic MEMS microphone according to claim 1, wherein the membrane is placed on a chip carrier with gold electrical paths and gold wire bond between the membrane and the chip carrier.

11. The fiber optic MEMS microphone according to claim 1, wherein dimensions of a membrane design are as follows:
a substrate thickness ($t_{subs}$) is >650 μm, a membrane diameter ($d_{membrane}$) is 1000 μm,
a hole-to-hole diameter ($d_{HOLE\text{-}TO\text{-}HOLE}$) is 50 μm,
a dimple diameter ($d_{dimple}$) is 12 μm,
a hole diameter ($d_{hole}$) is 36 μm,
a metal thickness ($t_{metal}$) is 0.51 μm,
a POLY2 thickness ($t_{poly2}$) is 1.5 μm,
a dimple thickness ($t_{dimple}$) is 0.75 μm,
a POLY1 thickness ($t_{poly1}$) is 2.0 μm,
a POLY0 thickness ($t_{poly0}$) is 0.51 μm, and
a SiN thickness ($t_{SiN}$) is 0.61 μm.

12. The fiber optic MEMS microphone according to claim 1, wherein the MEMS device is remotely driven and controlled by a laser power.

13. The fiber optic MEMS microphone according to claim 1, wherein a power of the power adjustable laser beam is converted into a voltage source controlling the MEMS device via the photodiode chip integrated with the MEMS device.

* * * * *